United States Patent
Oohori et al.

(10) Patent No.: US 7,024,298 B2
(45) Date of Patent: Apr. 4, 2006

(54) CONTROL APPARATUS FOR VEHICLE PROVIDED WITH AN AUTOMATIC TRANSMISSION, AND METHOD OF CONTROLLING THE SAME

(75) Inventors: Takeshi Oohori, Fuji (JP); Jihoon Kang, Fuji (JP); Yasutaka Kawamura, Fuji (JP); Donggyun Park, Fuji (JP)

(73) Assignee: Jatco Ltd, Fuji (JP)

( * ) Notice: Subject to any disclaimer, the term of this patent is extended or adjusted under 35 U.S.C. 154(b) by 54 days.

(21) Appl. No.: 10/650,083

(22) Filed: Aug. 28, 2003

(65) Prior Publication Data

US 2004/0064231 A1 Apr. 1, 2004

(30) Foreign Application Priority Data

Aug. 30, 2002 (JP) .............................. 2002-254056

(51) Int. Cl.
*G06F 15/00* (2006.01)
(52) U.S. Cl. ........................... 701/54; 701/84; 701/86; 701/87; 180/197
(58) Field of Classification Search ................. 701/51, 701/54, 55, 82, 84, 86, 87; 180/197
See application file for complete search history.

(56) References Cited

U.S. PATENT DOCUMENTS

| 4,819,187 | A | * | 4/1989 | Yasue et al. ................... 701/99 |
| 5,091,854 | A | * | 2/1992 | Yoshimura et al. ......... 701/101 |
| 5,433,676 | A | * | 7/1995 | Abe et al. .................... 477/109 |
| 5,826,208 | A | * | 10/1998 | Kuroiwa et al. .............. 701/54 |
| 6,014,604 | A | * | 1/2000 | Kuroiwa et al. .............. 701/54 |

* cited by examiner

*Primary Examiner*—Thomas G. Black
*Assistant Examiner*—Eric M. Gibson
(74) *Attorney, Agent, or Firm*—Foley & Lardner LLP (57) ABSTRACT

A vehicle is provided with an engine (1), an automatic transmission (2) connected to the engine (1), a detection device (21–24, 31) which detects an operating state of the transmission (2), and a torque regulating mechanism (1a, 1b, 1c) which regulates a torque of the engine. When the operating state of the transmission (2) is in a predetermined drive state and the torque of the engine (1) is to be reduced, a selection is made, based on the operating state of the transmission (2), between a first torque reduction control whereby the torque of the engine (1) is reduced rapidly and temporarily, and a second torque reduction control whereby the torque of the engine (1) is reduced continuously, and more smoothly than in the first torque reduction control. The torque of the engine (1) is then reduced by the selected one of the first torque reduction control and the second torque reduction control.

12 Claims, 6 Drawing Sheets

CONTROL APPARATUS FOR VEHICLE PROVIDED WITH AN AUTOMATIC TRANSMISSION, AND METHOD OF CONTROLLING THE SAME

BACKGROUND OF THE INVENTION

1. Field of the Invention

The present invention relates to controlling a vehicle provided with an automatic transmission.

2. Description of the Related Art

An automatic transmission of a vehicle is provided with a speed change controller, and the speed change controller controls a speed ratio and an oil pressure of the transmission. Some of the speed change controllers have a function to issue a command (torque reduction request) to an engine controller for reducing engine torque in order to suppress speed change shocks during upshifts and downshifts. The engine torque is temporarily reduced by a predetermined amount through use of an ignition timing retardation or a cutoff in fuel.

However, a period during which torque reduction is performed in the conventional example described above is only temporary. The torque reduction therefore cannot handle a situation in which torque reduction is requested continually. For example, if a state exists whereby the pressure supplied by a hydraulic pump does not reach a necessary pressure (due to extremely low temperatures or hydraulic system damage), it is necessary to perform torque reduction continuously to control the engine torque so that it does not exceed the amount of torque capable of being transmitted by the automatic transmission. However, there is such a risk that damage may be imparted to three-way catalysts in the engine, if ignition timing retardation or a cutoff in fuel is performed continuously.

Further, the amount of torque reduction is a predetermined amount that is set in advance and cannot respond to fluctuations in the amount of torque reduction required.

With a V-belt continuously variable transmission, an oil pressure is supplied to a pair of pulleys and torque is transmitted while a V-belt is gripped by the pulleys. The amount of torque that can be transmitted (torque capacity) is therefore always changing in accordance with changes in the operating state. If the torque capacity becomes smaller than the input torque, torque reduction corresponding to the amount of reduction in the torque capacity must be performed immediately in order to prevent V-belt slippage. However, it is difficult to perform torque reduction in accordance with the amount of reduction in the torque capacity with the conventional technique described above because the torque reduction amount is fixed. Further, after performing immediate torque reduction, it is necessary to perform torque reduction continuously for cases where the torque capacity drops rapidly due to damage of the hydraulic system or the like. The conventional technique described above cannot handle continuous torque reduction, however.

SUMMARY

An object of the present invention, therefore, is to achieve temporary torque reduction or continuous torque reduction in accordance with speed change controller requests.

According to the present invention, there is provided a control apparatus for a vehicle having an engine and an automatic transmission connected to the engine. The control apparatus includes: a detection devices which detects an operating state of the transmission; a torque regulating mechanism which regulates a torque of the engine; and a controller. When the operating state of the transmission is in a predetermined operating state and the engine torque is to be reduced, a selection is made, based on the operating state of the transmission, between a first torque reduction control whereby the engine torque is reduced rapidly and temporarily, and a second torque reduction control whereby the engine torque is reduced continuously, and more smoothly than in the first torque reduction control. The engine torque is then reduced by the selected one of the first torque reduction control and the second torque reduction control.

DETAILED DESCRIPTION OF THE PREFERRED EMBODIMENTS

Preferred embodiments and advantages of the present invention are explained in detail below with reference to the drawings appended hereto.

Figure 1:
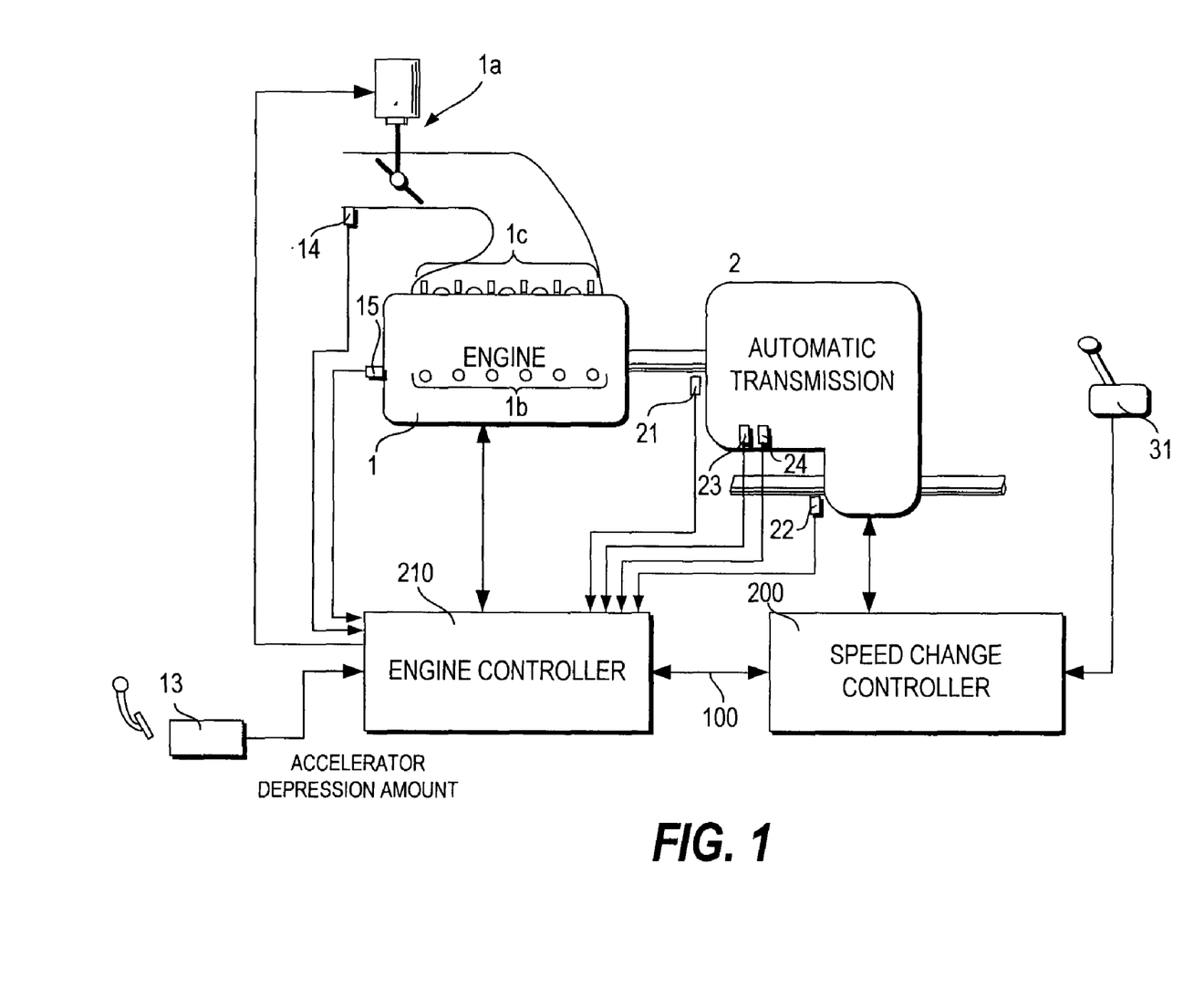
FIG. 1 is a schematic structural diagram of a vehicle that applies a control apparatus relating to the present invention.

Refer to FIG. 1 of the drawings. FIG. 1 shows a vehicle provided with a control apparatus relating to the present invention. A torque of an engine 1 is transmitted to drive wheels that are not shown through an automatic transmission 2. An engine controller 210 is connected to the engine 1 for controlling the torque and the rotation speed of the engine 1. A speed change controller 200 is connected to the transmission 2 for controlling a speed ratio and an oil pressure of the transmission 2. The speed change controller 200 and the engine controller 210 perform bidirectional communication through communicating means 100.

The speed change controller 200 controls the speed ratio and the oil pressure of the transmission 2 based on a select lever position signal detected by a select lever position sensor 31, signals from sensors 21 to 24 attached to the transmission 2, an accelerator depression amount, an engine rotation speed, and an engine torque from the engine controller 210.

The sensors 21 to 24 that are attached to the transmission 2 include: the input rotation speed sensor 21 for detecting an input rotation speed of the transmission 2; the output rotation speed sensor 22 for detecting an output rotation speed of the transmission 2, or a vehicle speed; the oil temperature sensor 23 for detecting an oil temperature of the transmission 2; and the oil pressure sensor 24 for detecting oil pressures, such as a line pressure.

In addition, the speed change controller 200 sends a torque reduction request signal to the engine controller 210 when the torque from the engine 1 becomes too large. Torque reduction control is then performed for reducing the torque of the engine 1.

The engine controller 210 reads in values for the accelerator depression amount detected by an accelerator depression amount sensor 13, an air intake amount from an air flow meter 14, and an engine rotation speed from a crank angle sensor 15. The engine controller 210 controls a fuel injection amount, an injection timing, and the air intake amount of the engine 1 based on those values. The intake air amount is controlled by adjusting an opening of an electronic control throttle 1a, the fuel injection amount is controlled by adjusting a fuel injection pulse width to fuel injection valves 1b, and the ignition timing is controlled by changing a timing at which a voltage is applied to spark plugs 1c.

The engine controller 210 determines a manner of effecting torque reduction when a torque reduction request is received from the speed change controller 200, and performs ignition timing retardation, fuel reduction or fuel cut if a rapid torque reduction is determined. The opening of the electronic control throttle 1a is reduced for cases where a smooth torque reduction is determined. The engine torque is thus reduced until it becomes less than a torque limit value input from the speed change controller 200.

Figure 2:
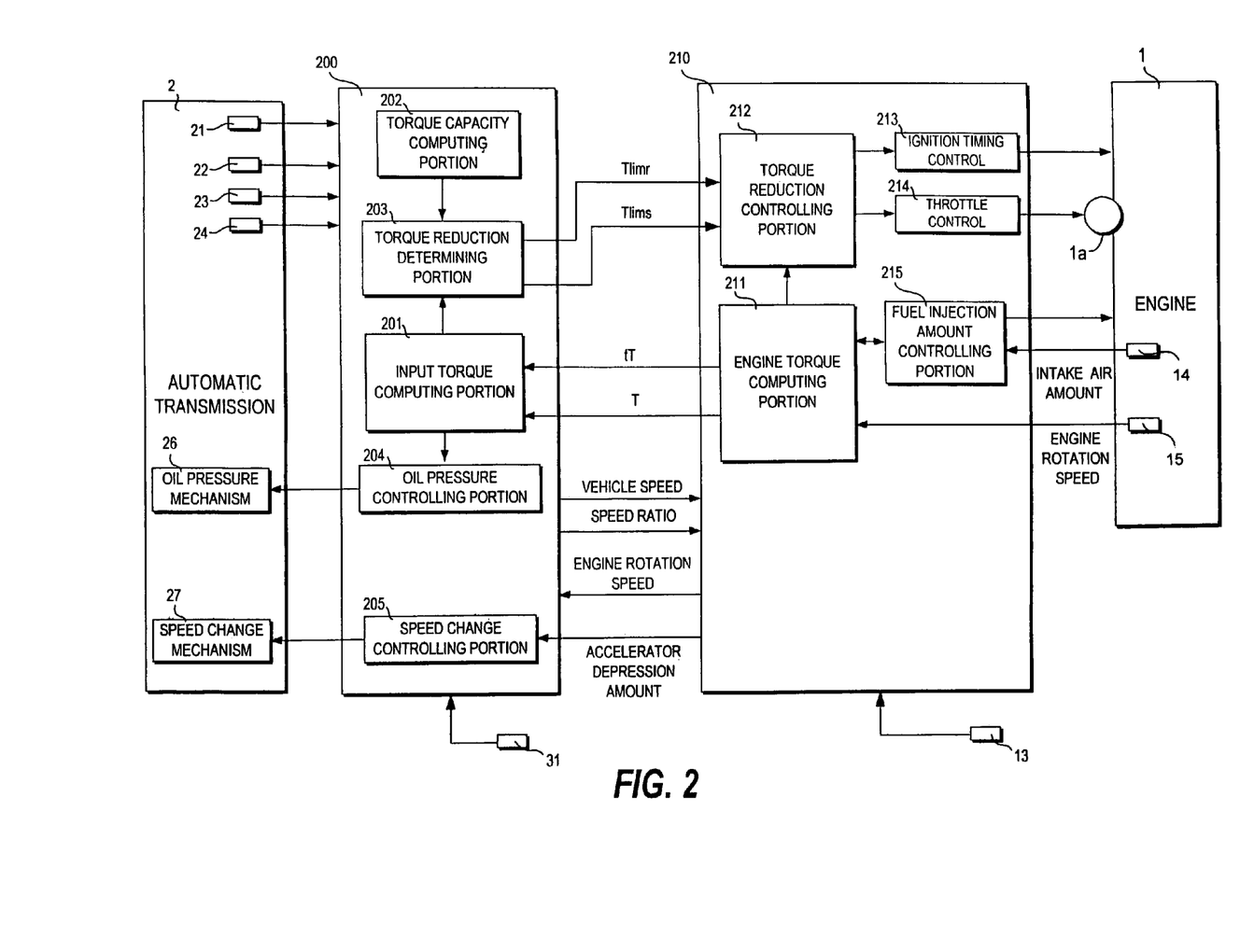
FIG. 2 is a block diagram of a speed change controller and an engine controller.

FIG. 2 shows a control block diagram of the speed change controller 200 and the engine controller 210.

The speed change controller 200 is provided with an input torque computing portion 201 for computing a torque Tin that is input to the transmission 2, based on a target engine torque tT input from the engine controller 210 and a current engine torque T, and a torque capacity computing portion 202 for computing a torque that can be transmitted by the transmission 2 (torque capacity) Tcap, based on values detected by the sensors 21 to 24 that are attached to the transmission 2.

A torque reduction determining portion 203 requests torque reduction control from the engine controller 210 for reducing the engine torque T, based on the input torque Tin and the torque capacity Tcap. The torque reduction determining portion 203 computes a torque reduction amount DT when the input torque Tin exceeds the torque capacity Tcap, and when speed change shocks are to be reduced. Limit values Tlimr and Tlims for the engine 1 are also computed.

In addition, the torque limit determining portion 203 selects whether to employ a rapid torque reduction by rapidly and temporarily reducing the torque of the engine 1 (first torque reduction control), or whether to employ a smooth torque reduction by continuously reducing the torque of the engine 1 at a smoother rate than that employed in the rapid torque reduction (second torque reduction control). The determination is made based on the operating state of the transmission 2 at the time when the torque reduction request is generated. A limit value for the torque of the engine 1, and a signal that indicates whether the requested torque reduction is the rapid torque reduction or the smooth torque reduction are sent to the engine controller 210.

An oil pressure controlling portion 204 determines a target value for each type of oil pressure, including the line pressure, based on the input torque from the input torque computing portion 201 and values detected by the sensors 21 to 24. The oil pressure controlling portion 204 controls an oil pressure mechanism 26 of the transmission 2 based on the target values. The oil pressure mechanism 26 controls the torque capacity of the transmission 2 by controlling tightening pressures for friction tightening elements (forward clutches and the like), and if a V-belt continuously variable transmission is used, by controlling a pulley thrust force.

A speed change controlling portion 205 determines a target speed ratio based on the vehicle speed (or output rotation speed), the accelerator depression amount from the accelerator depression amount sensor 13, and the select lever position signal from the select lever position sensor 31. The speed change controlling portion 205 controls a speed change mechanism 27 of the transmission 2 based in the target speed ratio.

The engine controller 210 is provided with: an engine torque computing portion 211 that determines the target engine torque tT based on the air intake amount from the air flow meter 14, the engine rotation speed from the crank angle sensor 15, and the accelerator depression amount from the accelerator depression amount sensor 13; a fuel injection amount controlling portion 215 for controlling the amount of fuel injection for the engine 1; an ignition timing controlling portion 213 for controlling the ignition timing of the engine 1; and a throttle controlling portion 214 for controlling the electronic control throttle 1a of the engine 1. A torque reduction controlling portion 212 is provided between the engine torque computing portion 211, and both the ignition timing controlling portion 213 and the throttle controlling portion 214.

The torque reduction controlling portion 212 reads in the torque limit values Tlimr and Tlims for cases where there is a torque reduction request from the speed change controller 200, and limits the torque of the engine 1 based on the torque limit values Tlimr and Tlims, thus implementing torque reduction on the engine 1.

A method of limiting the torque of the engine 1 is to perform switching in accordance with whether the requested torque reduction is the rapid torque reduction or the smooth torque reduction. That is, ignition timing retardation is performed by the ignition timing controlling portion 213, or a reduction or cutoff in the amount of fuel supplied is performed by the injection amount controlling portion 215, if the torque reduction requested by the speed change controller is the rapid torque reduction, thus performing torque reduction rapidly and temporarily. The ignition timing retardation may also be performed at the same time as the reduction or cutoff in the amount of fuel supplied.

The throttle controlling portion 214 reduces the opening amount of the electronic control throttle 1a for the smooth torque reduction case, thus performing continuous torque reduction having low responsiveness.

Figure 3:
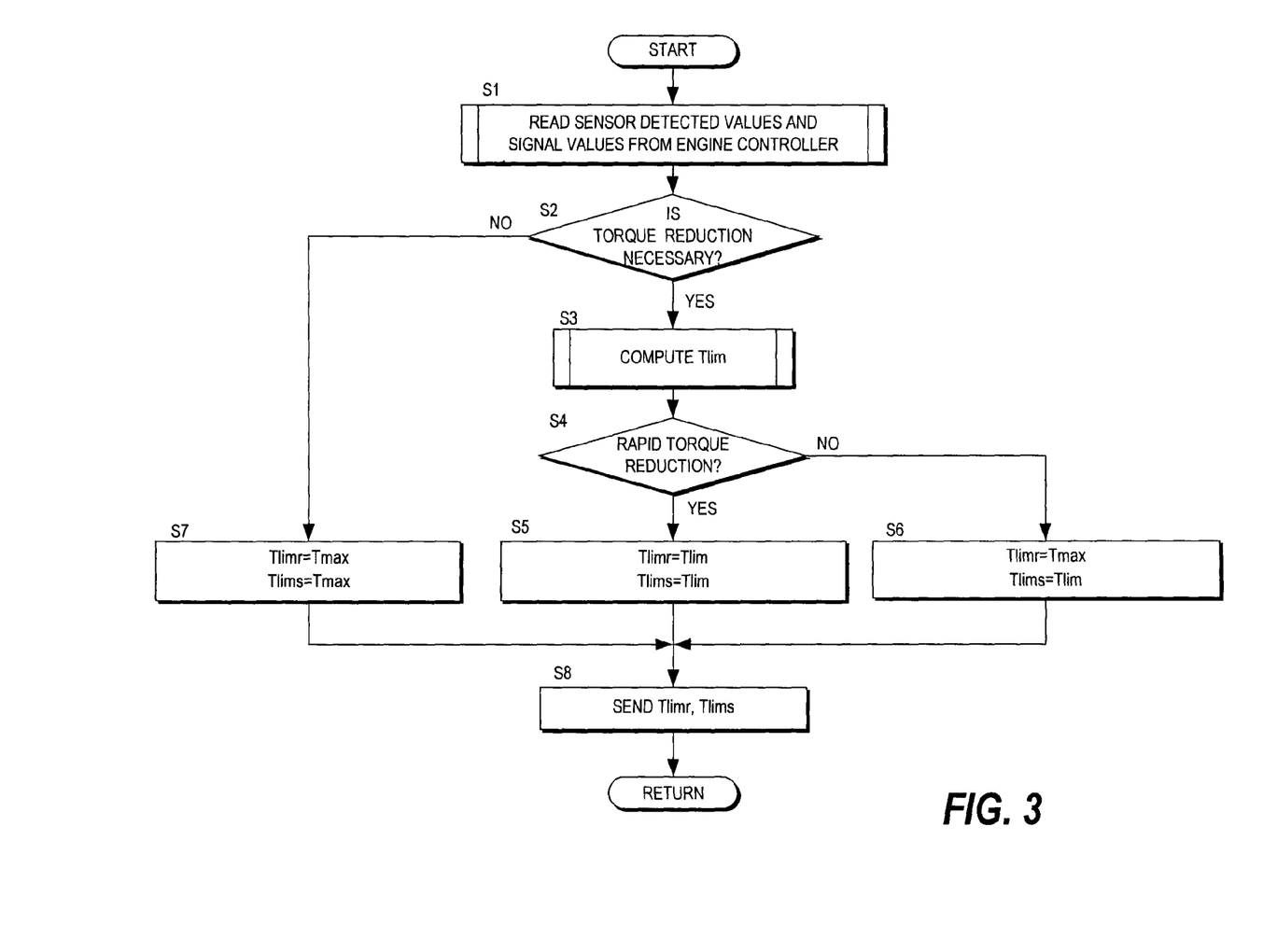
FIG. 3 is a flowchart showing torque reduction request control performed by the speed change controller.

FIG. 3 is a flowchart showing torque reduction request control performed by the speed change controller 200. Control is performed for predetermined periods of time (for example, several tens of milliseconds).

In a step S1, values detected by the sensors 21 to 24 that are attached to the transmission 2, and signal values from the engine controller 210 are read in.

A determination of whether or not torque reduction is necessary is made in a step S2 based on the operating state of the transmission 2. Operational states for which it is determined that torque reduction is necessary include, for example:
 (i) when speed change transients such as upshifts or downshifts are present (during fluctuations in the speed ratio);
 (ii) during select lever operation when a select lever is moved from a N(neutral)-range to a D(drive)-range, or an R(reverse)-range;
 (iii) when the oil temperature of the transmission 2 is low, and a necessary oil pressure cannot be obtained; and
 (iv) when the oil pressure mechanism 26 is damaged, for example when the line pressure is reduced due to damage in a hydraulic pump. It may also be determined that torque reduction is necessary in operating states other than those listed above.

Torque reduction is determined to be necessary when the operating state of the transmission 2 satisfies any of the states (i) to (iv) stated above, and operation proceeds to a step S3. Operation proceeds to a step S7 if torque reduction is unnecessary.

The torque limit value Tlimr for the rapid torque reduction and the torque limit value Tlims for the smooth torque reduction are both set to a maximum torque Tmax of the engine 1 in the step S7.

In the step S3, a torque limit value Tlim that is used when setting the torque limit values Tlimr and Tlims is calculated.

Computation of the torque limit value Tlim is discussed in detail below, but in brief, the torque Tin to be input to the transmission 2 is found first. Further, the torque capacity Tcap (transmissible torque) is found based on the operating state of the transmission 2. A value is computed as the torque reduction amount DT by subtracting the torque capacity Tcap from the input torque Tin. The torque limit value Tlim is then found by subtracting the torque reduction amount DT from the target engine torque tT that is input from the engine controller 210.

A determination is made in a step S4 as to whether or not the requested torque reduction is the rapid torque reduction or the smooth torque reduction. This determination is performed in accordance with the determination of the step S2. For example, whether to reduce the engine torque rapidly and temporarily for the rapid torque reduction, or whether to reduce the engine torque smoothly and continuously for the smooth torque reduction, is set in advance for every operating state that causes torque reduction, for example:

(i) the rapid torque reduction for speed change transients (during fluctuations in the speed ratio);
(ii) the rapid torque reduction during select lever operation;
(iii) the smooth torque reduction when the oil temperature is low; and
(iv) the smooth torque reduction when there is damage to the oil pressure mechanism.

Operation proceeds to a step S5 if the determination results show that the requested torque reduction is the rapid torque reduction, while operation proceeds to a step S6 for the smooth torque reduction.

A torque limit value Tlim found in the step S3 is set as the torque limit value Tlimr for the rapid torque reduction, and as the torque limit value Tlims for the smooth torque reduction, in the step S5. Even though the rapid torque reduction is performed, the torque limit value Tlims for the smooth torque reduction is also set because it is necessary for the torque reduction to continue after the rapid torque reduction is performed if there is damage to the hydraulic system or the like.

The torque limit value Tlim found in the step S3 is set as the torque limit value Tlims for the smooth torque reduction in the step S6. On the other hand, the maximum torque Tmax of the engine 1 is set as the torque limit value Tlimr for the rapid torque reduction.

The torque limit value Tlimr for the rapid torque reduction and the torque limit value Tlims for the smooth torque reduction are sent to the engine controller 210 in a step S8.

The torque limit values Tlimr and Tlims are output even if torque reduction is not necessary. In this case, however, the maximum torque value Tmax of the engine 1 is set as the torque limit values Tlimr and Tlims in the step S7, and therefore torque reduction is not actually performed.

Figure 4:
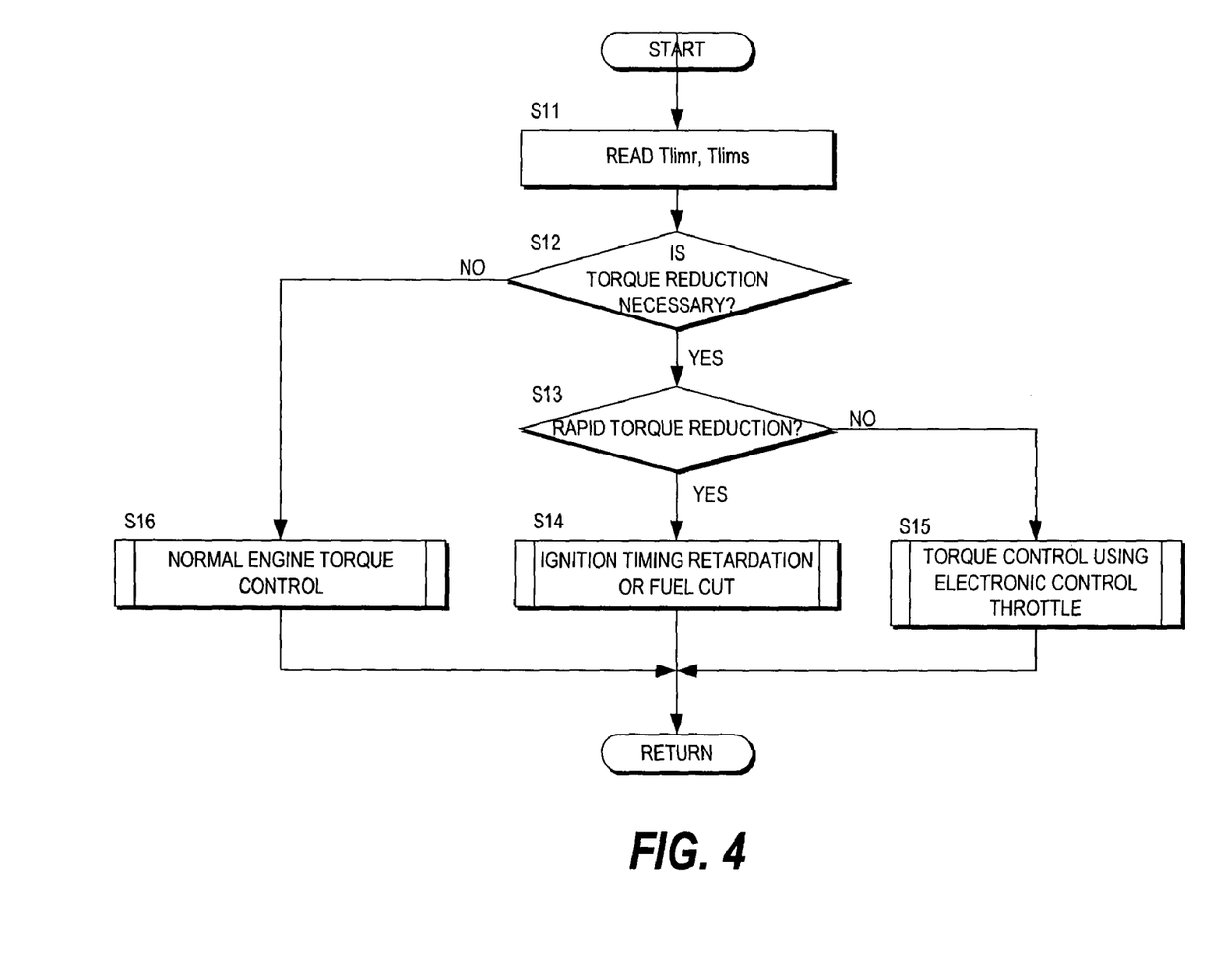
FIG. 4 is a flowchart showing torque reduction control performed by the engine controller.

FIG. 4 is a flowchart showing torque reduction control performed by the engine controller 210. Control is performed for predetermined periods of time (for example, every 10 msec). Torque reduction is performed by limiting the torque of the engine 1 based on the torque limit values Tlimr and Tlims that are input from the speed change controller 200.

First, in a step S11, the torque limit value Tlimr for the rapid torque reduction and the torque limit value Tlims for the smooth torque reduction are read in.

If either one of the two torque limit values Tlimr and Tlims is less than the maximum engine torque Tmax in a step S12, it is determined that a torque reduction is requested, and operation proceeds to a step S13. Conversely, if both of two torque limit values Tlimr and Tlims are equal to the maximum engine torque Tmax, it is determined that a torque reduction is not requested, and operation proceeds to a step S16.

The torque limit values Tlimr and Tlims are set as upper limits for the engine torque when operation proceeds to the step S16. The torque limit values Tlimr and Tlims are equal to the maximum engine torque Tmax, and therefore torque reduction is not actually performed (normal engine torque control).

A determination is made in the step S13 based on the torque limit values Tlimr and Tlims as to whether the requested torque reduction is the rapid torque reduction or the smooth torque reduction.

The torque reduction is judged to be the rapid torque reduction if the torque limit value Tlimr for the rapid torque reduction is less than the maximum engine torque Tmax, and operation proceeds to a step S14.

The engine torque is rapidly and temporarily reduced in the step S14 by performing ignition timing retardation of the engine 1, or by cutting off or reducing the amount of fuel supplied. The engine torque is thus limited to the torque limit value Tlimr for the rapid torque reduction. Ignition timing retardation and a cutoff or reduction in the amount of fuel supplied may also be performed simultaneously.

Note that operation proceeds from the step S13 to the step S15, even for cases in which the torque reduction requested by the step S13 is determined to be the rapid torque reduction, once a predetermined value has been reached (for example, several seconds) for the elapsed time after ignition timing retardation starts, or after a cutoff or reduction in the amount of fuel supply starts. Operation then switches to the smooth torque reduction. The switch to the smooth torque reduction occurs after the predetermined amount of time has elapsed in order to prevent damage to exhaust catalysts. The predetermined amount of time is set based on the durability of the exhaust catalysts.

If the torque limit value Tlimr for the rapid torque reduction is equal to the maximum engine torque Tmax, and the torque limit value Tlims for the smooth torque reduction is less than the maximum engine thrust Tmax, operation proceeds to the step S15.

The engine torque is reduced smoothly and continuously by reducing the opening of the electronic control throttle 1a in the step S15, and the engine torque is limited to the torque limit value Tlims for the smooth torque reduction.

Figure 5:
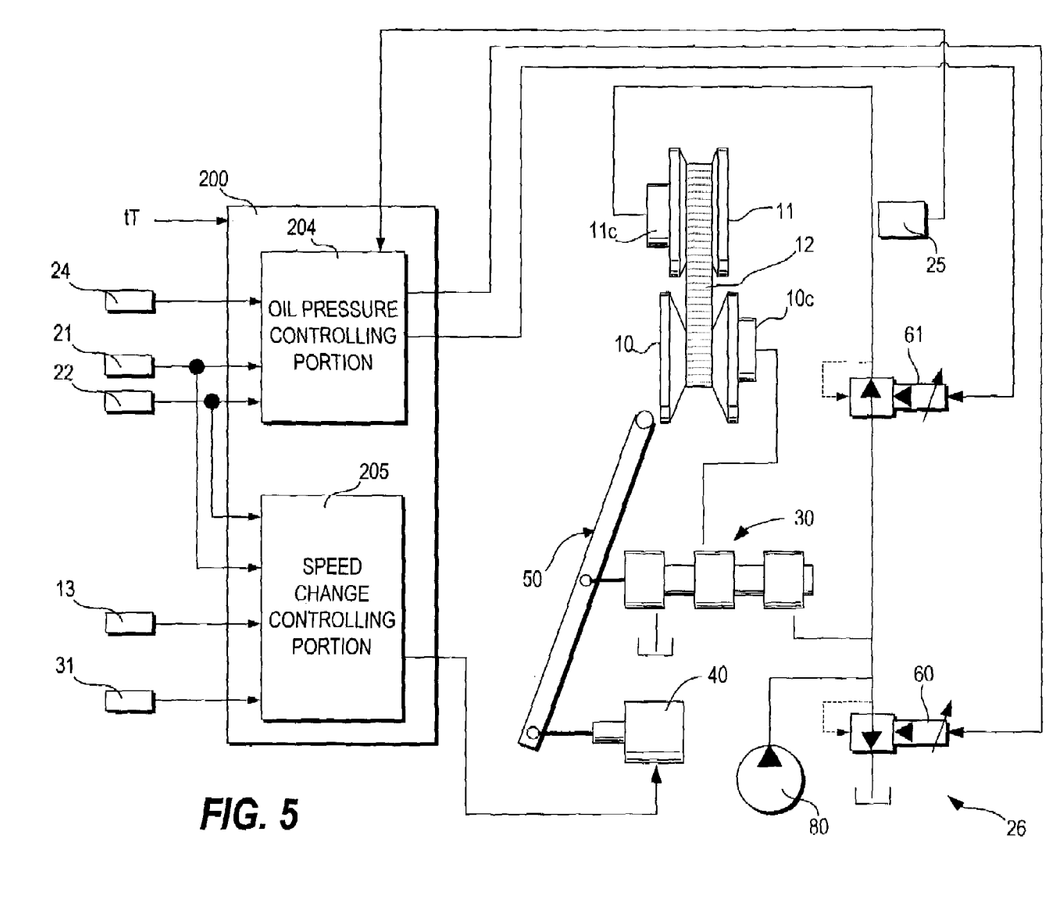
FIG. 5 is a schematic structural diagram showing a case in which a transmission is a V-belt continuously variable transmission.

Computation of the torque capacity, the input torque, and the torque limit values for a case where the automatic transmission 2 is a V-belt continuously variable transmission (CVT), as shown in FIG. 5, is explained next.

The V-belt CVT is provided with an input side primary pulley 10, an output side secondary pulley 11, and a V-belt 12 wound between the pulleys 10 and 11. The primary pulley 10 is coupled to the engine 1 through a torque converter provided with a lock-up clutch, and through a forward and reverse changeover mechanism. The secondary pulley 11 is coupled to drive wheels through a differential gear unit.

The primary pulley 10 is structured by a fixed conical plate that rotates integrally with an input shaft, and a moveable conical plate that is disposed opposing the fixed conical plate, thus forming a V-shape pulley groove. The movable conical plate displaces in an axial direction due to an oil pressure (primary pressure) acting on a primary pulley cylinder chamber 10c. Similarly, the secondary pulley 11 is structured by a fixed conical plate that rotates integrally with an output shaft, and a moveable conical plate that is disposed opposing the fixed conical plate, thus forming a V-shape pulley groove. The movable conical plate displaces in an axial direction due to an oil pressure (secondary pressure) acting on a secondary pulley cylinder chamber 11c.

The primary pulley cylinder chamber 10c and the secondary pulley cylinder chamber 11c are set to have equal pressure receiving surface areas.

A rotation speed ratio between the primary pulley 10 and the secondary pulley 11, in other words the speed ratio of the transmission 2, can be changed in a continuous manner by displacing the moveable conical plate of the primary pulley 10 and the moveable conical plate of the secondary pulley 11 in the axial direction, thus changing the contact radius between the V-belt 12 and the pulleys 10 and 11. The speed ratio and a contact frictional force with the V-belt 12 are controlled by a hydraulic mechanism 26.

The hydraulic mechanism 26 is mainly structured by a regulator valve 60 for controlling line pressure, a speed change control valve 30 for controlling the oil pressure of the primary pulley cylinder chamber 10c (hereinafter referred to as primary pressure), and a pressure reduction valve 61 for controlling the pressure supplied to the secondary pulley cylinder chamber 11c (hereinafter referred to as secondary pressure).

The speed change control valve 30 is coupled to a servo link 50 that structures a mechanical feedback mechanism. The speed change control valve 30 is driven by a stepping motor 40 that is coupled to one end of the servo link 50, and receives a groove width, in other words speed ratio feedback, from the moveable conical plate of the primary pulley 10, which is coupled to the other end of the servo link 50.

The regulator valve 60 is provided with a solenoid for regulating the oil pressure from a hydraulic pump 80. The regulator valve 60 regulates pressure to a predetermined line pressure PL in response to a command from the speed change controller 200 (a duty signal, for example).

The line pressure PL is supplied to the speed change control valve 30 that controls the primary pressure, and to the pressure reducing valve 61, which is provided with a solenoid valve for controlling the secondary pressure.

The speed ratio is controlled by the stepping motor 40, which is driven in accordance with a speed change command signal from the speed change controller 200. If the servo link 50 is displaced by the stepping motor 40, a spool of the speed change control valve 30 displaces, and the line pressure PL supplied to the speed change control valve 30 is adjusted to the primary pressure and supplied to the primary pulley 10. The groove width changes as a result, and the speed ratio changes to a predetermined speed ratio.

The speed change control valve 30 increases or decreases oil pressure in the primary pulley cylinder chamber 10c by displacement of the spool therein. The speed change control valve 30 regulates the primary pressure such that a target speed ratio commanded as a position of the stepping motor 40 is achieved. The spool moves to a closed position when the speed change is complete due to action by the servo link 50.

Computation of the torque capacity, input torque, and torque limit values of the transmission 2 is performed as follows.

First, the transmission oil temperature, the primary pulley rotation speed (input rotation speed), the secondary pulley rotation speed (output rotation speed or vehicle speed), and the secondary pressure are each read in. An oil pressure sensor 25 detects the secondary pressure.

The actual speed ratio (or pulley ratio) is found next from the ratio between the primary pulley rotation speed and the secondary pulley rotation speed.

The detected secondary pressure is multiplied by the pressure receiving surface area of the pressure chamber 11c of the secondary pulley 11, and a thrust force (secondary thrust force) by which the secondary pulley 11 grips the V-belt 12 is found.

Figure 6:
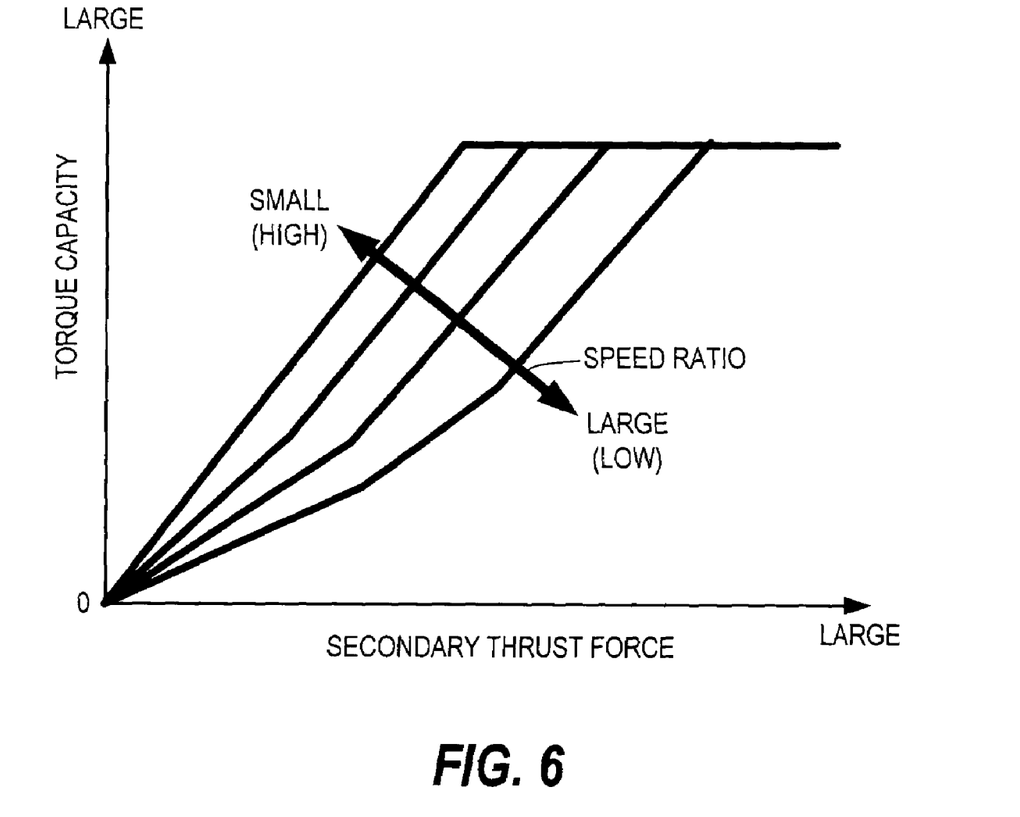
FIG. 6 is a map that prescribes a relationship for torque capacity with respect to speed ratio and secondary thrust force.

The torque capacity of the V-belt CVT is found next based on the computed speed ratio and the thrust force of the secondary pulley 11, with reference to a map shown in FIG. 6.

The map of FIG. 6 is one that prescribes a relationship between the torque capacity with respect to the speed ratio and the secondary thrust force. The torque capacity becomes constant if the secondary thrust force exceeds a predetermined value, no matter what the value of the speed ratio is. The torque capacity found by referencing the map may also be multiplied by a predetermined safety factor. Slippage of the V-belt 12 can thus be prevented, even if there is deterioration of parts over time or the like.

The target engine torque tT is read in from the engine controller 210 as the engine torque T. Note that the engine torque T may be computed from the pulse width of the fuel injection (fuel injection amount), the engine rotation speed, and the like. In addition, if a map of the characteristics of the engine 1 is provided, the engine torque may also be estimated from the accelerator depression amount and the engine rotation speed by referencing the map of the engine characteristics.

The engine torque T is then corrected based on the converter state of the torque converter and the operating state of the hydraulic pump 80, and the torque Tin input to the primary pulley 10 is computed. For a converter state in which the lock-up clutch of the torque converter is released, the engine torque is corrected by a torque converter torque ratio, and the input torque Tin is computed. The engine torque T and the input torque Tin become equal to each other in a lock-up state where the lock-up clutch is tightly secured.

In addition, the torque necessary in driving the hydraulic pump 80 is subtracted from the input torque Tin. The torque necessary for driving the hydraulic pump 80 can be found from the engine rotation speed, the line pressure, the oil temperature, and the like if the hydraulic pump 80 is coupled to a pump side (engine side) of the torque converter.

The torque Tin that is input to the primary pulley 10 can accurately be found by correcting the engine torque T in accordance with the torque ratio of the torque converter and the driving torque of the hydraulic pump 80.

The torque reduction amount DT is computed next from the difference between the torque capacity Tcap, which is found by referencing the map of FIG. 6, and the input torque Tin of the primary pulley 10.

For example, if the torque capacity is taken as Tcap, the input torque is taken as Tin, and the safety factor is taken as k, then the torque reduction amount DT is computed by the following equation:

$$DT=(Tin-Tcap) \times K.$$

The torque limit value Tlim is computed by the following equation, taking the target engine torque as tT:

$$Tlim=tT-DT.$$

The present invention is thus not limited to step automatic transmissions made from friction tightening elements and planetary gear mechanisms. It can also be applied to V-belt CVTs. In addition, the invention can also be applied to other types of CVTs, for example toroidal CVTs.

Furthermore, in addition to limiting the engine torque, the engine rotation speed may also be limited during torque reduction control. For example, the speed change controller 200 may also send a request for reducing the engine rotation speed so that the engine rotation speed does not exceed a value set in advance if the select lever position is the N-range or a P-range. Slippage of the V-belt 12 can thus be further prevented during operation of the select lever.

This application claims priority from Japanese Patent Application 2002-254056, filed Aug. 30, 2002, which is incorporated herein by reference in its entirety.

What is claimed is:

1. A control apparatus for a vehicle that is provided with an engine and an automatic transmission connected to the engine, the control apparatus comprising:
   a detection device that detects an operating state of the transmission;
   a torque regulating mechanism that regulates a torque of the engine; and
   a controller that is configured to:
      determine whether a rapid torque reduction or a smooth torque reduction is required based on the operating state of the transmission,
      perform a first torque reduction control when the rapid torque reduction is required, the first torque reduction control being a control whereby the torque of the engine is reduced rapidly and temporarily by:
         (a) an ignition timing delay of the engine,, and/or
         (b) a reduction of a fuel amount supplied to the engine,
      perform a second torque reduction control when the smooth torque reduction is required, the second torque reduction control being a control whereby the torque of the engine is reduced continuously, and more smoothly than in the first torque reduction control by reducing an engine intake air amount, and
      when the rapid torque reduction is required and the first torque reduction control is performed, switch to the second torque reduction control from the first torque reduction control, if the first torque reduction control continues for a predetermined period of time.

2. A control apparatus according to claim 1, wherein the switch to the second torque reduction control from the first torque reduction control is configured to prevent damage to an exhaust catalyst.

3. A control apparatus according to claim 1, wherein the controller is also configured to compute the amount of torque reduction of the engine when the torque of the engine is reduced, based on a torque transmittable by the transmission and based on a torque input to the transmission.

4. A control apparatus according to claim 1, wherein the controller is also configured to reduce the torque of the engine when the torque input to the transmission exceeds the torque transmittable by the transmission.

5. A control apparatus for a vehicle that is provided with an engine and an automatic transmission connected to the engine, the control apparatus comprising:
   a detection device that detects an operating state of the transmission;
   a torque regulating mechanism that regulates a torque of the engine;
   means for determining whether a rapid torque reduction or a smooth torque reduction is required based on the operating state of the transmission;
   means for performing a first torque reduction control when the rapid torque reduction is required, the first torque reduction control being a control whereby the torque of the engine is reduced rapidly and temporarily by:
      (a) an ignition timing delay of the engine, and/or
      (b) a reduction of a fuel amount supplied to the engine;
   means for performing a second torque reduction control when the smooth torque reduction is required, the second torque reduction control being a control whereby the torque of the engine is reduced continuously, and more smoothly than in the first torque reduction control by reducing an engine intake air amount; and
   means for, when the rapid torque reduction is required and the first torque reduction control is performed, switching to the second torque reduction control from the first torque reduction control, if the first torque reduction control continues for a predetermined period of time.

6. A control apparatus according to claim 5, wherein the switch to the second torque reduction control from the first torque reduction control is configured to prevent damage to an exhaust catalyst.

7. A control apparatus according to claim 5, wherein the means for making a selection is configured to compute the amount of torque reduction of the engine when the torque of the engine is reduced, based on a torque transmittable by the transmission and based on a torque input to the transmission.

8. A control apparatus according to claim 5, wherein the means for reducing the torque of the engine is configured to reduce the torque of the engine when the torque input to the transmission exceeds the torque transmittable by the transmission.

9. A control method for a vehicle that is provided with an engine, an automatic transmission connected to the engine, a detection device that detects an operating state of the transmission, and a torque regulating mechanism that regulates a torque of the engine, the control method comprising the steps of:
   determining whether a rapid torque reduction or a smooth torque reduction is required based on the operating state of the transmission;
   performing a first torque reduction control when the rapid torque reduction is required, the first torque reduction control being a control whereby the torque of the engine is reduced rapidly and temporarily by:
      (a) an ignition timing delay of the engine, and/or
      (b) a reduction of a fuel amount supplied to the engine;
   performing a second torque reduction control when the smooth torque reduction is required, the second torque reduction control being a control whereby the torque of the engine is reduced continuously, and more smoothly than in the first torque reduction control by reducing an engine intake air amount; and when the rapid torque reduction is required and the first torque reduction control is performed, switching to the second torque reduction control from the first torque reduction control, if the first torque reduction control continues for a predetermined period of time.

10. A control method according to claim 9, wherein the switch to the second torque reduction control from the first torque reduction control is configured to prevent damage to an exhaust catalyst.

11. A control method according to claim 5, wherein the step of making a selection comprises computing the amount of torque reduction of the engine when the torque of the engine is reduced, based on a torque transmittable by the transmission and based on a torque input to the transmission.

12. A control method according to claim 9, wherein the step of reducing the torque of the engine comprises reducing the torque of the engine when the torque input to the transmission exceeds the torque transmittable by the transmission.

* * * * *